J. S. WHISLER.
WAGON BRAKE.

No. 32,392.  Patented May 21, 1861.

Witnesses

Inventor.
Jacob S. Whisler
By his Attorney
Thos. H. Dodge

UNITED STATES PATENT OFFICE.

JACOB S. WHISLER, OF ALBANY, ILLINOIS.

WAGON-BRAKE.

Specification of Letters Patent No. 32,392, dated May 21, 1861.

*To all whom it may concern:*

Be it known that I, JACOB S. WHISLER, of Albany, in the county of Whiteside and State of Illinois, have invented certain new and useful Improvements in Self-Acting Carriage-Brakes; and I do hereby declare the following to be a full, clear, and exact description of the same, reference being had to the accompanying drawings, forming a part of this specification, and in which—

Figure 1:
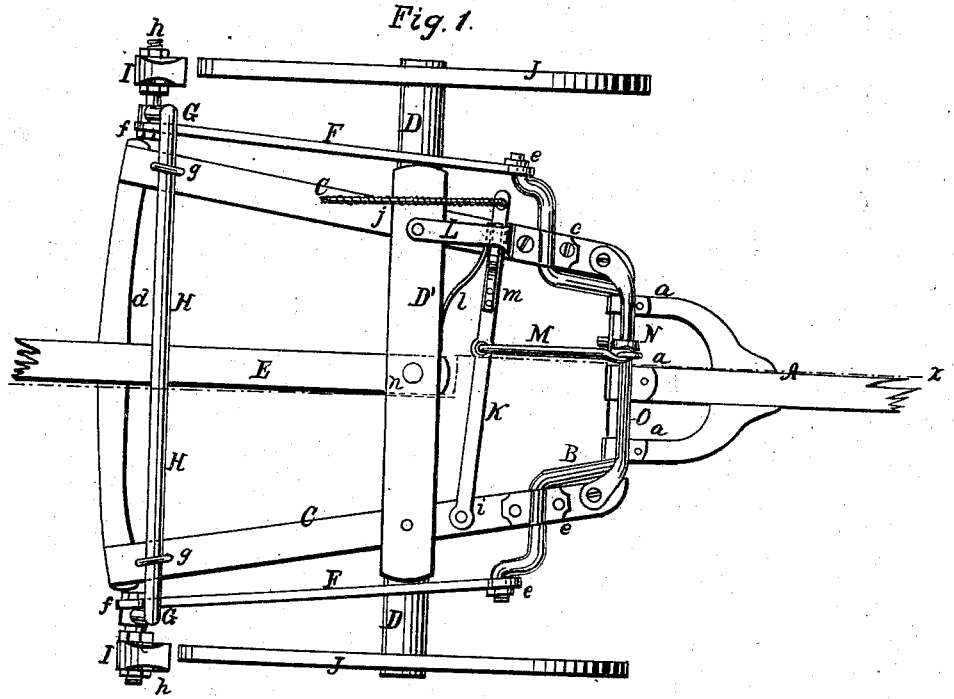
Figure 2:
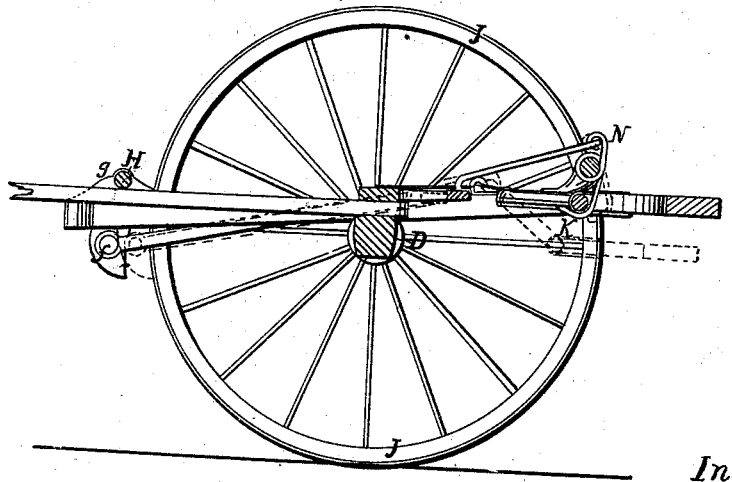

Figure 1, represents so much of a carriage as is necessary to illustrate my invention. Fig. 2, represents a section on line $x$, $x$—Fig. 1.

In the drawings, A represents the tongue, the rear end of which is hinged at $a$, to the middle of a double crank shaft B, which is supported and turns in bearings $c$, $c$, on the front of hounds C, C, permanently fastened to axle D, and united by a middle piece D′, and at their rear ends by a cross piece $d$, which also supports the reach or connecting piece E, pivoted at $n$, between axle D, and center piece D′.

To the outer ends of cranks $e$, $e$, on the double crank shaft B, are hinged or loosely connected the front ends of connecting or rubber rods F, F, whose rear ends are connected, as seen at $f$, to the inside of cranks G, G, on the rubber shaft H, which turns in bearings $g$, $g$ on the rear of the hounds C, C. Opposite where the rods F, F, are connected to cranks G, are fastened brake blocks I, I, and which in this instance is effected by passing a journal or crank piece $h$, through the end of each crank G, so that the inner end will project far enough to receive the rods F, F, while the outer ends will project far enough to receive the brake blocks I, I, the front ends of which are cut out to fit the periphery of the wheels J, J, on axle D.

In descending a hill, as the weight of the carriage presses forward against the team, the inner or middle crank on shaft B, is caused to turn down and back as shown in red lines in Fig. 2, whereby the cranks $e$, $e$, are caused to turn up and forward, thus drawing the rubber rods F, F, forward together with the cranks G, G, and rubber blocks I, I, whereby said blocks are made to press against the wheels J, J, as indicated in red lines Fig. 2. The rubber blocks will continue to press against the wheels so long as the carriage presses against the team, but as soon as the carriage begins to be drawn by the power of the team, then the parts are made to assume the position shown in black lines, caused by hte forward motion of the middle crank on shaft B, which throws the rubbers back.

In order to enable the team to back the carriage without the rubbers pressing against the wheels, a lever $k$, is hinged at $i$, to one of the hounds C, while the other end is passed under or through a stationary loop or guide piece L, while at or near its middle is hinged or pivoted one end of a connecting rod M, whose front end is pivoted to the top of a check piece N, which turns on a stationary journal piece O, fastened to the front ends of hounds C, C. The lower end of N, is bent back nearly at right angles, as fully shown in Fig. 2.

To the swinging end of K, is attached a rope, chain, or other suitable device $j$, and which is to be so arranged as to be within the reach of the driver. Now when the driver wishes to back the carriage, he draws up the rope $j$, whereby the rod or piece K, is drawn as shown in red Fig. 1—and the hook part $k$, of the piece N, drawn forward as shown in red lines Fig. 2, permitting the crank shaft B, to be drawn into the position shown in black lines, when the driver lets the piece spring back into its former position, thus bringing the hook $k'$, under the middle of crank B, as seen in black lines. It will now be seen that the power of the team in backing will not cause the rubber blocks to press against the wheels C, C since the shaft B, will be kept from assuming the position shown in red lines Fig. 2, by means of hook $k$. When once in this position, the brakes will not act on the wheels unless the hook $k$, has been drawn forward so as to let the shaft B, revolve, or its middle crank to turn down as shown in red lines. After the parts are once in the latter position, and the driver lets go of the cord $j$, the shaft B, will not pass up above hook $k$, until it has been drawn back again.

In descending very steep roads, hook $k$, can be fastened back so as not to require the attention of the driver. With a view to keep the piece K, in the position shown in black lines Fig. 1, I use a spring $l$, fastened to center piece D′, while to keep the parts from rattling, I fasten another spring $m$, to piece K, so that it will press against the loop or guide piece L.

The reach or coupling piece E, which connects the front and rear wheels, is pivoted at $n$, between the center piece D, fastened to the tops of hounds C, C.

Having described my invention, what I claim and desire to secure by Letters Patent, is:

The combination of check piece N, having a hook $k$, with the rear part of the tongue and crank shaft B, as and for the purposes set forth.

In witness whereof I have hereunto subscribed my name.

JACOB S. WHISLER.

In presence of—
 GEORGE T. SMITH,
 ASHBY I. KINNY.